US010906650B2

(12) United States Patent
Suarez et al.

(10) Patent No.: US 10,906,650 B2
(45) Date of Patent: Feb. 2, 2021

(54) DYNAMIC RETENTION SYSTEM FOR AN AIRCRAFT SEAT

(71) Applicant: Rockwell Collins, Inc., Cedar Rapids, IA (US)

(72) Inventors: Alfredo Suarez, Miramar, FL (US); Moises Perez, Miami, FL (US); Michael L. Oleson, Parkland, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 8 days.

(21) Appl. No.: 16/134,096

(22) Filed: Sep. 18, 2018

(65) Prior Publication Data

US 2020/0086997 A1    Mar. 19, 2020

(51) Int. Cl.
 *B64D 11/06* (2006.01)
(52) U.S. Cl.
 CPC ........ *B64D 11/0696* (2013.01); *B64D 11/064* (2014.12); *B64D 11/0648* (2014.12)
(58) Field of Classification Search
 CPC .............. B64D 11/0696; B64D 11/064; B64D 11/0648
 See application file for complete search history.

(56) References Cited

U.S. PATENT DOCUMENTS

| 4,376,522 A * | 3/1983 | Banks ................ B64D 11/0696 244/118.6 |
| 5,337,979 A * | 8/1994 | Bales ................ B64D 11/0696 244/118.1 |
| 8,292,224 B1 * | 10/2012 | Ahad ................ B61D 33/0057 244/118.6 |
| 2003/0025373 A1 | 2/2003 | Shinozaki |
| 2013/0300145 A1 | 11/2013 | Otake et al. |
| 2016/0047429 A1 | 2/2016 | Ferguson et al. |
| 2017/0233079 A1 * | 8/2017 | Kovago ............ B64D 11/0696 248/188.9 |

FOREIGN PATENT DOCUMENTS

| EP | 1176047 A1 | 1/2002 |
| EP | 1197378 A1 | 4/2002 |
| WO | 2016149510 A1 | 9/2016 |

\* cited by examiner

*Primary Examiner* — Anthony D Barfield
(74) *Attorney, Agent, or Firm* — Suiter Swatz pc llo

(57) ABSTRACT

The dynamic retention system may include at least one plunger assembly including a plunger base coupled to a base assembly of an aircraft seat and a spring-loaded plunger coupled to a seat frame. The spring-loaded plunger may be configured to contact the plunger base. The dynamic retention system may include at least one hook receptacle coupled to the base assembly, and at least one structural hook coupled to the seat frame. The at least one hook receptacle may be configured to receive the at least one structural hook responsive to the spring-loaded plunger contacting the plunger base. The seat frame may be coupled to the base assembly via an actuation assembly. The aircraft seat may be actuatable between a first position and at least a second position.

19 Claims, 11 Drawing Sheets

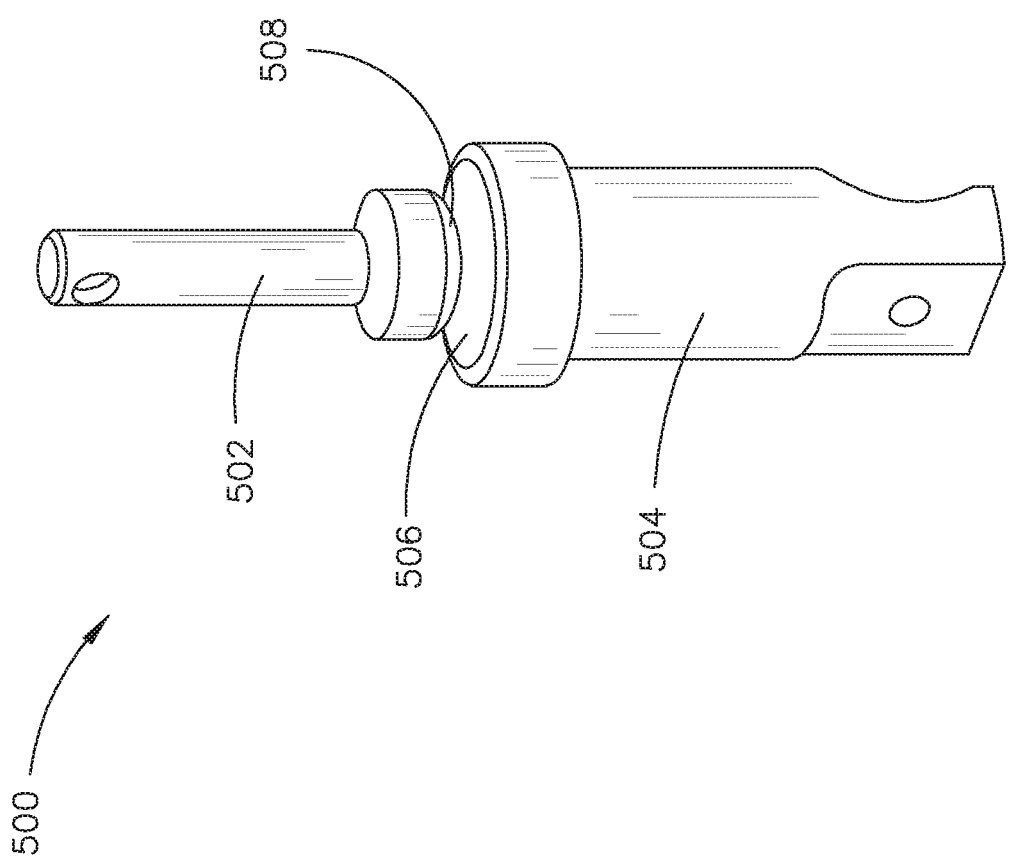

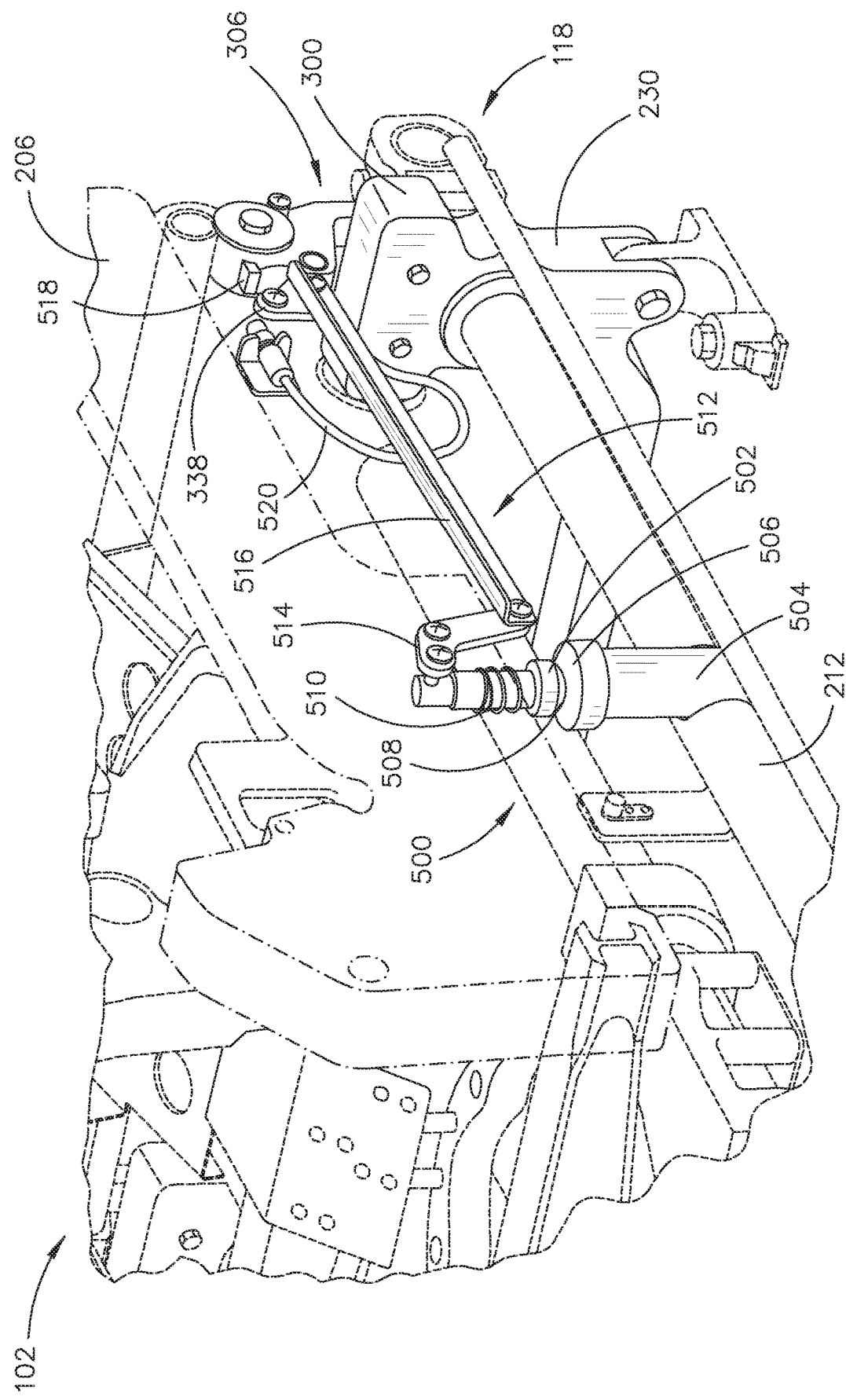

DYNAMIC RETENTION SYSTEM FOR AN AIRCRAFT SEAT

BACKGROUND OF THE INVENTION

One type of aircraft seat may include a track-and-swivel assembly, where the track-and-swivel assembly is coupled to a base assembly, where the base assembly is coupled to a set of floor tracks in an aircraft via a set of floor fittings. The track-and-swivel assembly may allow the aircraft seat to be moveable by an occupant. However, the track-and-swivel assembly may not be configured to distribute dynamic loads to the set of floor tracks, which may cause harm to the occupant in the case of an emergency situation such as a crash. For example, the front of the aircraft seat may lift during an aft-crash, as the aircraft seat is only coupled to the base assembly via the track-and-swivel assembly positioned at or near the rear of the aircraft seat.

Another type of aircraft seat may include a base assembly with a load distribution system, where the load distribution system may be configured to distribute (e.g., allocate) a dynamic load to the floor tracks. However, this type of aircraft seat may be fixed in position when coupled to the set of floor tracks in the aircraft via the set of floor fittings, such that the aircraft seat may not be positionable by an occupant.

Therefore, it would be advantageous to provide a solution that addresses the shortcomings described above.

SUMMARY

In one aspect, embodiments of the inventive concepts disclosed herein are directed to a dynamic retention system for an aircraft seat. The dynamic retention system may include at least one plunger assembly. The at least one plunger assembly may include a plunger base coupled to a base assembly of an aircraft seat. The base assembly may be couplable to a floor of an aircraft. The at least one plunger assembly may include a spring-loaded plunger coupled to a seat frame of the aircraft seat. The spring-loaded plunger may be configured to contact the plunger base. The dynamic retention system may include at least one hook receptacle coupled to the base assembly. The dynamic retention system may include at least one structural hook coupled to the seat frame. The at least one hook receptacle may be configured to receive the at least one structural hook responsive to the spring-loaded plunger contacting the plunger base. The seat frame may be coupled to the base assembly via an actuation assembly. The aircraft seat may be actuatable between a first position and at least a second position via the actuation assembly. The aircraft seat may be in the first position when the spring-loaded plunger is in contact with the plunger base and the at least one structural hook is received within the at least one hook receptacle. The aircraft seat may be in the at least the second position when the spring-loaded plunger is not in contact with the plunger base and the at least one structural hook is withdrawn from the at least one hook receptacle.

In a further aspect, embodiments of the inventive concepts disclosed herein are directed to an aircraft seat. The aircraft seat may include a base assembly couplable to a floor of an aircraft. The aircraft seat may include a seat frame coupled to the base assembly via an actuation assembly. The aircraft seat may include a dynamic retention system. The dynamic retention system may include at least one plunger assembly. The at least one plunger assembly may include a plunger base coupled to the base assembly. The at least one plunger assembly may include a spring-loaded plunger coupled to the seat frame. The spring-loaded plunger may be configured to contact the plunger base. The dynamic retention system may include at least one hook receptacle coupled to the base assembly. The dynamic retention system may include at least one hook receptacle coupled to the base assembly. The dynamic retention system may include at least one structural hook coupled to the seat frame. The at least one hook receptacle may be configured to receive the at least one structural hook responsive to the spring-loaded plunger contacting the plunger base. The actuation assembly may be configured to allow for actuation between a first position and at least a second position. The first position may be when the spring-loaded plunger is in contact with the plunger base and the at least one structural hook is received within the at least one hook receptacle. The at least the second position may be when the spring-loaded plunger is not in contact with the plunger base and the at least one structural hook is withdrawn from the at least one hook receptacle.

In a further aspect, embodiments of the inventive concepts disclosed herein are directed to a dynamic retention system for a seat. The dynamic retention system may include at least one assembly. The at least one assembly may include a first component coupled to a base assembly of a seat. The base assembly may be couplable to a floor of a vehicle. The at least one plunger assembly may include a second component coupled to a seat frame of the seat. The second component may be configured to contact the first component. The dynamic retention system may include at least one hook receptacle coupled to the base assembly. The dynamic retention system may include at least one structural hook coupled to the seat frame. The at least one hook receptacle may be configured to receive the at least one structural hook responsive to the second component contacting the first component. The seat frame may be coupled to the base assembly via an actuation assembly. The seat may be actuatable between a first position and at least a second position via the actuation assembly. The seat may be in the first position when the second component is in contact with the first component and the at least one structural hook is received within the at least one hook receptacle. The seat may be in the at least the second position when the second component is not in contact with the first component and the at least one structural hook is withdrawn from the at least one hook receptacle.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5A is a perspective view of an exemplary embodiment of a plunger assembly for a dynamic retention system according to the inventive concepts disclosed herein;

FIG. 5B is a partial perspective view of an exemplary embodiment of an aircraft seat including a dynamic retention system according to the inventive concepts disclosed herein;

DETAILED DESCRIPTION OF EXEMPLARY EMBODIMENTS

Figure 1:
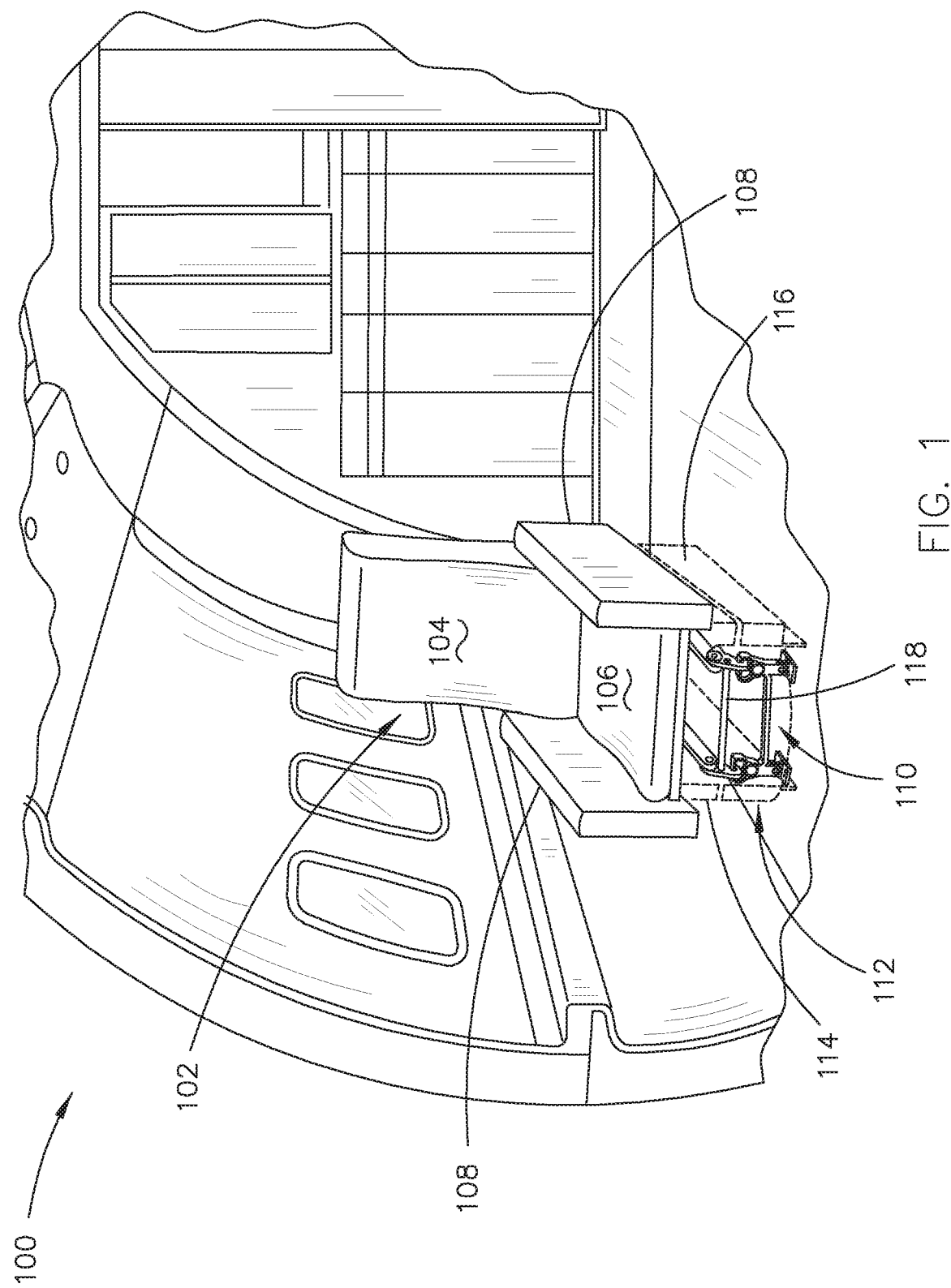
FIG. 1 is an exemplary embodiment of an aviation environment in which an aircraft seat including a dynamic retention system may be implemented according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, any arrangement of components to achieve a same functionality is effectively "associated" such that the desired functionality is achieved, such that any two components herein combined to achieve a particular functionality can be seen as "associated with" each other (irrespective of architectures or intermedial components). Any two components so associated can also be viewed as being "operably connected" or "operably coupled" to each other to achieve the desired functionality, and any two components capable of being so associated can also be viewed as being "operably couplable" to each other to achieve the desired functionality. Examples of operably couplable include, but are not limited to, physically mateable and/or physically interacting components, wirelessly interactable and/or wirelessly interacting components, logically interacting and/or logically interactable components, or the like.

Further, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

FIGS. 1-6C generally illustrate exemplary embodiments of a dynamic retention system for an aircraft seat in accordance with the inventive concepts disclosed herein.

Broadly, embodiments of the inventive concepts disclosed herein are directed to a dynamic retention system for an aircraft seat. More particularly, embodiments of the inventive concepts disclosed herein are directed to a dynamic retention system for an aircraft seat configured to allow for motion of the aircraft seat via at least one of tracking or swiveling, and further configured to distribute a dynamic load applied to the aircraft seat.

It is noted herein a dynamic retention system may be implemented in any environment or number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Where the environment may be an aviation environment, the dynamic retention system may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

FIG. 1 illustrates an exemplary embodiment of an aircraft cabin 100 including an aircraft seat 102 according to the inventive concepts disclosed herein.

The aircraft seat 102 may include a seat back 104. The aircraft seat 102 may include a seat 106. The aircraft seat 102 may include one or more arms 108. The aircraft seat 102 may be coupled to a base 110. The base 110 may be covered by a shroud 112. For example, the shroud 112 may include one or more sections configured to cover at least a portion of the aircraft seat 102. For instance, the shroud 112 may include a bucket shroud section 114 and a base shroud section 116. It is noted herein, however, that the shroud 112 may be formed from one piece (e.g., includes a single section).

The aircraft seat 102 may include a dynamic retention system 118. The dynamic retention system 118 may be implemented at or near the front of the aircraft seat 102 for aft-facing conditions. It is noted herein, however, that the dynamic retention system 118, any component of the dynamic retention system 118, and/or any other component of the aircraft seat 102 may be adapted and/or configured as necessary to be implemented at or near the rear of the aircraft seat 102 for forward-facing conditions. As such, any description provided with respect to the implementing of the dynamic retention system 118 at or near the front of the aircraft seat 102 for aft-facing conditions may be considered to extend to the implementing of the dynamic retention system 118 at or near the rear of the aircraft seat 102 for forward-facing conditions. Therefore, the above description should not be interpreted as a limitation on the present disclosure but merely an illustration.

Figure 2A:
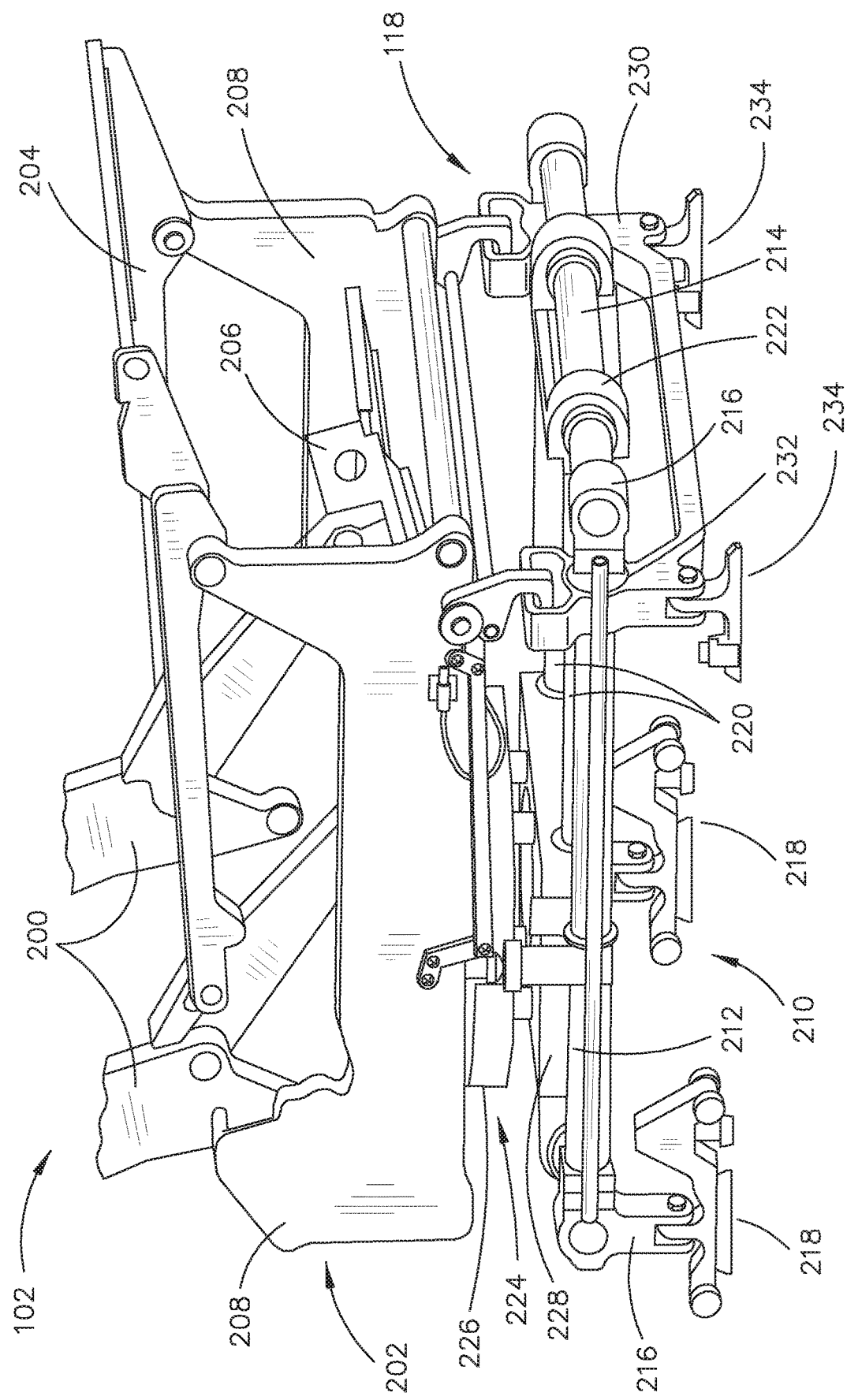
FIG. 2A is a partial perspective view of an exemplary embodiment of an aircraft seat including a dynamic retention system according to the inventive concepts disclosed herein.
Figure 2B:
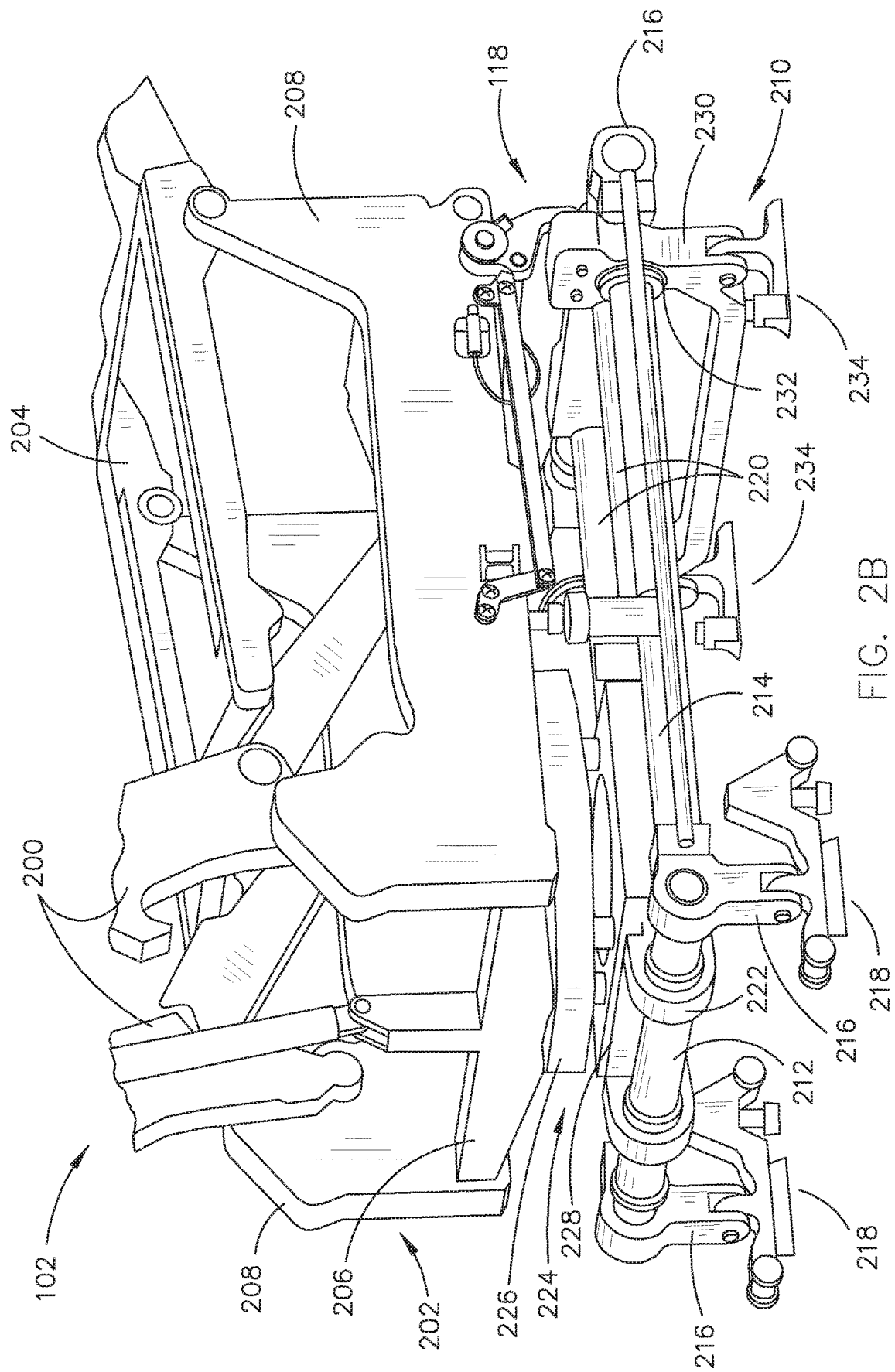
FIG. 2B is a partial perspective view of an exemplary embodiment of an aircraft seat including a dynamic retention system according to the inventive concepts disclosed herein.

FIGS. 2A and 2B illustrate embodiments of the aircraft seat 102 including the dynamic retention system 118 according to the inventive concepts disclosed herein.

The aircraft seat 102 may include a seat back frame 200. The aircraft seat 102 may include a seat frame 202. The aircraft seat 102 may include a seat pan 204. The seat frame 202 may include one or more components 206 and/or one or more components 208. For example, the one or more components 206, 208 may be configured to allow and/or assist the aircraft seat 102 to recline and/or return to an upright position.

One or more of the seat back frame 200 and/or the seat pan 204 may be directly coupled, or indirectly coupled, via one or more interconnecting components, to the one or more of the components 206, 208 of the seat frame 202. At least a portion of the shroud 112 (e.g., the bucket shroud section 114 of the shroud 112) may be configured to cover the seat frame 202 and/or the seat pan 204.

The aircraft seat 102 (e.g., the base 110, as illustrated in FIG. 1) may include a base assembly 210. The base assembly 210 may include one or more cross base rails 212 (e.g., cross-tubes, cross-bars, or the like). The base assembly 210 may include one or more base rails 214 (e.g., tubes, bars, or the like). For example, the one or more cross base rails 212 and/or the one or more base rails 214 may be positioned relative to a particular direction of travel of the aircraft seat 102 including, but not limited to, perpendicular (e.g., crosswise), parallel (e.g., cross-wise), or the like. For instance, the one or more cross base rails 212 and the one or more base rails 214 may be positioned relative to a same or a different direction of travel of the aircraft seat 102. In addition, the one or more cross base rails 212 and the one or more base rails 214 may be positioned relative to a same direction of travel of the aircraft seat 102.

The base assembly 210 may include one or more base brackets 216. For example, the one or more cross base rails 212 may be coupled to the one or more base rails 214 via the one or more base brackets 216. For example, a base bracket 216 may couple together an adjacent base rail 214 and cross base rail 212 at any angle, such that the base assembly 210 may include an outline of any geometric shape known in the art. For instance, the outline may be rectangular or substantially rectangular. Therefore, the above description should not be interpreted as a limitation on the present disclosure but merely an illustration.

The one or more base brackets 216 may be coupled to a set of floor tracks of the aircraft cabin 100 (e.g., as illustrated in FIG. 1) via one or more floor fittings 218. At least a portion of the shroud 112 (e.g., the base shroud section 116 of the shroud 112) may be configured to cover the base assembly 210.

The base 110 may include one or more tracking rails 220 coupled to the base assembly 210. The one or more tracking rails 220 may be positioned within a region defined by the base assembly 210 formed from the one or more base rails 214, the one or more cross base rails 212, and/or the one or more base brackets 216. The one or more tracking rails 220 may be coupled to the base assembly 210 (e.g., the one or more cross base rails 212, the one or more base rails 214, or the like) via one or more tracking frames 222.

The seat 106 and the base 110 (e.g., as illustrated in FIG. 1) may be coupled together via an actuation assembly 224 (e.g., a track-and-swivel assembly 224). For example, the seat frame 202 of the seat 106 (e.g., as illustrated in FIG. 1) and the base assembly 210 of the base 110 (e.g., as illustrated in FIG. 1) may be coupled together via the actuation assembly 224. The actuation assembly 224 may include a swivel base 226 attached to the aircraft seat 102 and a tracking base 228 attached to the base 110.

The aircraft seat 102 may be positionable via the actuation assembly 224. For example, the aircraft seat 102 may be positionable in a position configured for taxi, take-off, and/or landing (TTOL), or a TTOL position. For instance, the TTOL position may include the aircraft seat 102 being translated (e.g., tracked) fully outboard and seat-aft, and rotated (e.g., swiveled) to face fully forward or fully aft (e.g., depending on the installation of the aircraft seat 102 in an aircraft). By way of another example, the aircraft seat 102 may be positionable in a position configured for a non-TTOL stage of flight, or a non-TTOL position. For instance, any position that does not meet the above-defined requirements of the TTOL position may be considered a non-TTOL position. It is noted herein that the TTOL position may be considered a first position (e.g., default, primary, or the like) of the aircraft seat 102, for purposes of the present disclosure. In addition, it is noted herein that any non-TTOL position may be considered a second position (e.g., alternate, additional, or the like) of the aircraft seat 102 for purposes of the present disclosure.

The aircraft seat 102 may be translatable from the TTOL position to the non-TTOL position, and vice versa. The aircraft seat 102 may be configured to translate (e.g., track) along the one or more tracking rails 220 via the tracking base 228 of the actuation assembly 224. For example, the TTOL position may include a set of physical stops on the one or more tracking rails 220. By way of another example, the non-TTOL position may be any position along a pre-defined length of the one or more tracking rails 220. It is noted herein the aircraft seat 102 may be fully translatable along the pre-defined length of the one or more tracking rails 220 when in the non-TTOL position.

The aircraft seat 102 may be rotatable about an axis from the TTOL position to the non-TTOL position, and vice versa. The actuation assembly 224 may be configured to rotate (e.g., swivel) the swivel base 226 relative to the tracking base 228 about an axis through the actuation assembly 224. For example, the TTOL position may engage a swivel lock within the actuation assembly 224 when facing forward (or aft, depending on the installation of the aircraft seat 102 in an aircraft). By way of another example, the non-TTOL position may be any position offset from the TTOL position by an angle of a pre-defined range of angles. For instance, the angles may range from −15 degrees to 15 degrees, with the TTOL position at zero degrees. It is noted herein the aircraft seat 102 may be fully rotatable within the range of angles when in the non-TTOL position.

It is noted herein that a hard stop (e.g., physical stop and/or swivel lock) may only be utilized for the TTOL position. In this regard, an occupant of the aircraft seat 102 may be made fully aware when the aircraft seat 102 is in the TTOL position. In addition, it is noted herein that where the shroud 112 includes the bucket shroud section 114 and the base shroud section 116, the bucket shroud section 114 and the base shroud section 116 may be utilized as a visual indicator of the aircraft seat 102 being in the TTOL position. For example, the aircraft seat 102 may be in the TTOL position when the bucket shroud section 114 and the base shroud section 116 are aligned.

The dynamic retention system 118 may include a fixed base rail 230. The base assembly 210 may interact with the fixed base rail 230. For example, the one or more base rails 214 of the base assembly 210 may pass through one or more holes 232 in the fixed base rail 230. By way of another example, the one or more base rails 214 of the base assembly 210 may be coupled to the fixed base rail 230. It is noted herein, however, that the fixed base rail 230 may be considered a component of the base assembly 210, for purposes of the present disclosure.

The fixed base rail 230 may be coupled to the floor of the aircraft cabin 100 (e.g., as illustrated in FIG. 1) via one or more floor fittings 234. For example, the one or more floor fittings 234 may be different from the one or more floor fittings 218. By way of another example, the one or more floor fittings 234 may be identical to the one or more floor fittings 218.

Figure 3B:
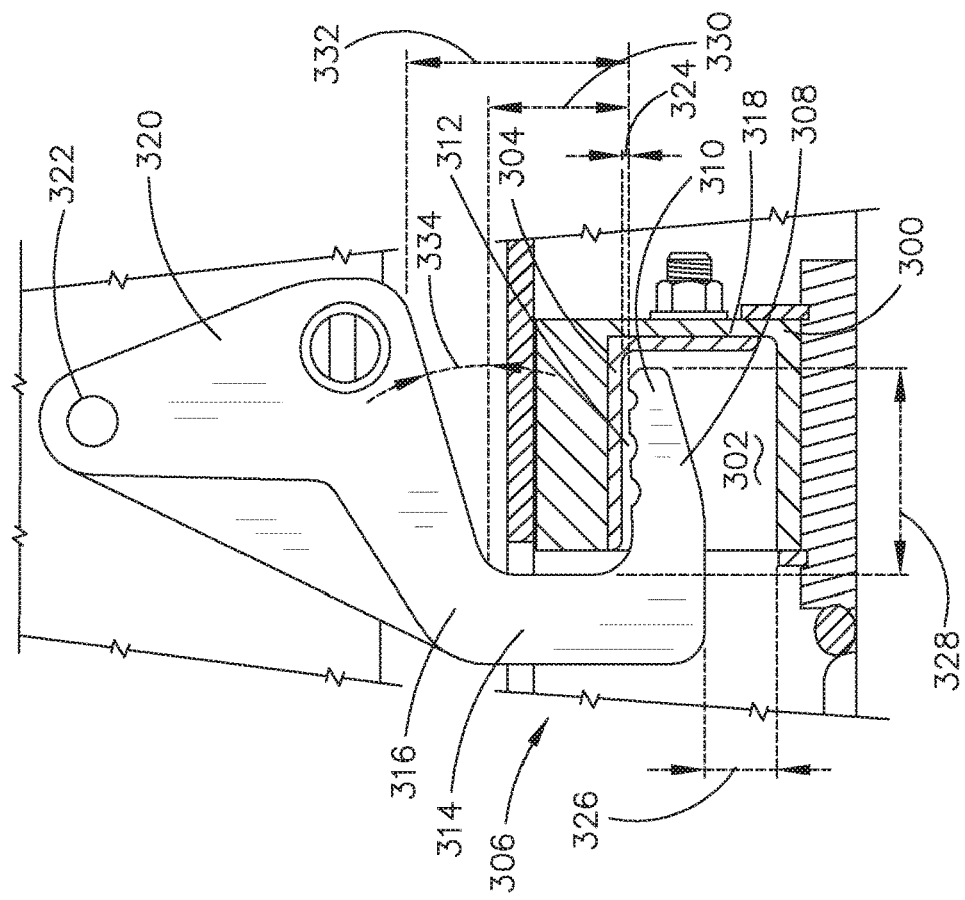
FIG. 3B is a partial side view of an exemplary embodiment of an aircraft seat including a dynamic retention system according to the inventive concepts disclosed herein.
Figure 3A:
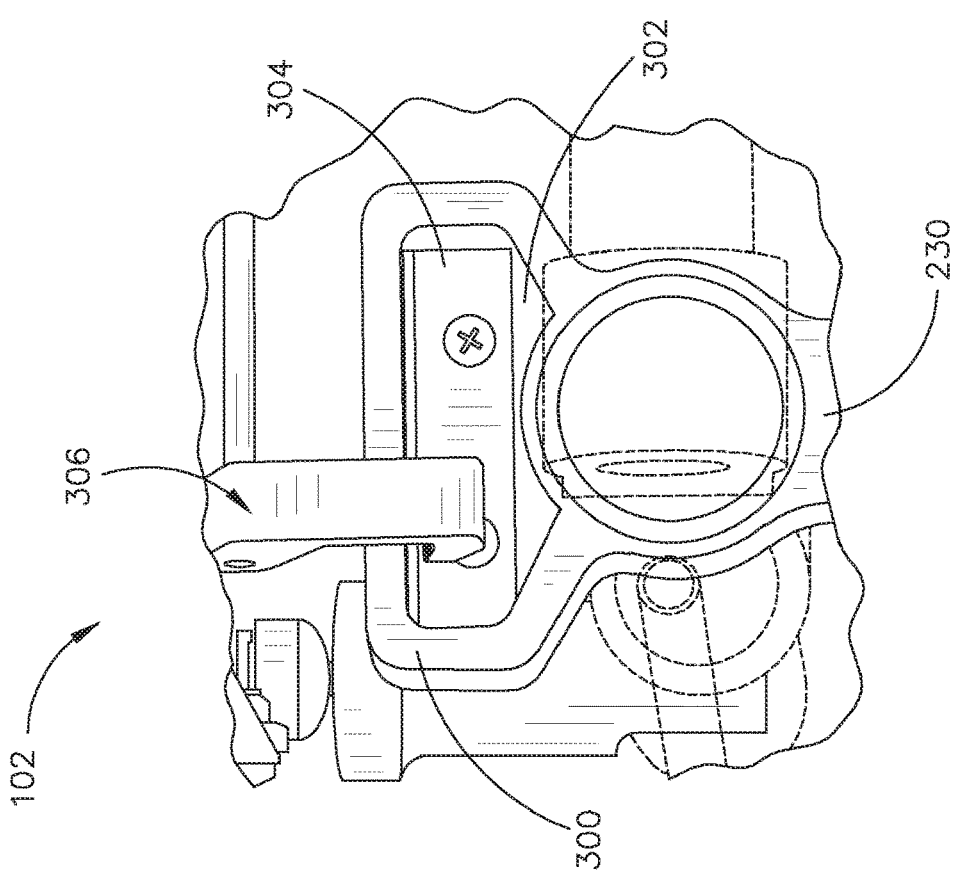
FIG. 3A is a partial perspective view of an exemplary embodiment of an aircraft seat including a dynamic retention system according to the inventive concepts disclosed herein.
Figure 3C:
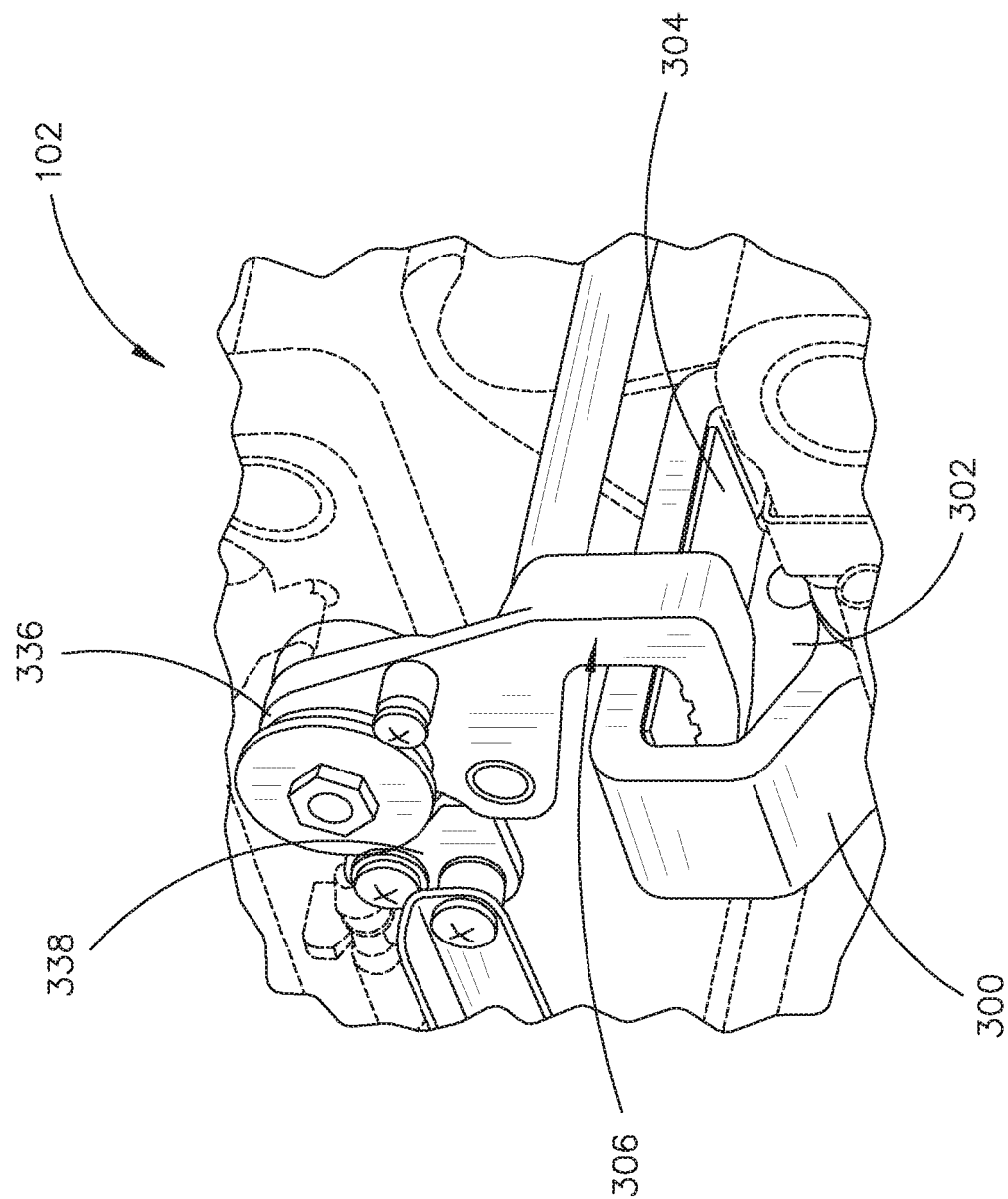
FIG. 3C is a partial perspective view of an exemplary embodiment of an aircraft seat including a dynamic retention system according to the inventive concepts disclosed herein.

FIGS. 3A-3C illustrate embodiments of the aircraft seat 102 including the dynamic retention system 118 according to the inventive concepts disclosed herein.

The dynamic retention system 118 may include one or more hook receptacles 300. The one or more hook receptacles 300 may include an opening 302. For example, the opening 302 may be fabricated within the fixed base rail 230 in one or more concurrent fabrication processes. By way of another example, the opening 302 may be fabricated within the fixed base rail 230 in one or more subsequent fabrication processes.

It is noted herein, however, that the one or more hook receptacles 300 may be a component separate from the fixed base rail 230. For example, the one or more hook receptacles 300 may be coupled to the fixed base rail 230 via an adhesive, one or more fasteners, one or more interlocking-component assemblies (e.g., an interlocking slot-and-tab assembly), or the like. By way of another example, the one or more hook receptacles 300 may be positioned proximate to the fixed base rail 230. By way of another example, the one or more hook receptacles 300 may be separated a select distance from the fixed base rail 230. Therefore, the above description should not be interpreted as a limitation on the present disclosure but merely an illustration.

The opening 302 may include one or more interior surfaces. For example, the one or more interior surfaces may be fabricated with one or more recesses and/or one or more protrusions in a patterned or un-patterned design. For instance, the one or more surfaces may be scored to generate a friction surface. By way of another example, the one or more interior surfaces may include a friction coating. It is noted herein, however, that the one or more interior surfaces may be smooth.

A friction angle plate 304 may be inserted within the opening 302. The friction angle plate 304 may be coupled to the one or more interior surfaces of the opening 302 via an adhesive, one or more fasteners, one or more interlocking-component assemblies (e.g., an interlocking slot-and-tab assembly), or the like. For example, the friction angle plate 304 may be coupled to a rear interior surface of the opening 302 via a set of countersunk fasteners.

The friction angle plate 304 may include one or more surfaces exposed within a cavity defined by the opening 302. For example, the one or more interior surfaces may be fabricated with one or more recesses and/or one or more protrusions in a patterned or un-patterned design. For instance, the one or more surfaces may be scored to generate a friction surface. By way of another example, the one or more surfaces may include a friction coating. It is noted herein, however, that the one or more surfaces exposed within the cavity defined by the opening 302 may be smooth.

The dynamic retention system 118 may include one or more structural hooks 306. The one or more structural hooks 306 may be configured to engage (e.g., latch to) the one or more hook receptacles 300. The one or more structural hooks 306 may reduce seat deformation by distributing a dynamic load. For example, the one or more structural hooks 306 may distribute the dynamic load through the fixed base rail 230 to one or more structural components of the base 110 (e.g., as illustrated in FIG. 1) including, but not limited to, the base assembly 210, the one or more tracking rails 220, the floor fittings 218, 234, or the like (e.g., as illustrated in FIGS. 2A-2B). For example, the one or more structural hooks 306 may distribute the dynamic load to the one or more floor tracks of the aircraft 100 (e.g., as illustrated in FIG. 1) via the one or more structural components of the base 110 (e.g., as illustrated in FIG. 1).

The one or more structural hooks 306 may include a bite (or throat) 308. The bite 308 may include a point 310. The point 310 may include one or more corners. For example, the one or more corners may include one or more fillets, one or more chamfers, and/or one or more edges. By way of another example, the one or more corners may be symmetric or non-symmetric.

The bite 308 may include one or more protrusions 312 (e.g., teeth). The one or more protrusions 312 may include any number of protrusions (e.g., 1, 2, ... up to an N number of protrusions). For example, the one or more protrusions 312 may be material remaining after grooves or recesses are generated in a top surface of the bite 308. For instance, a cross section of the grooves or recesses may be hemispherical (e.g., hemispherical, hypo-hemispherical, hyper-hemispherical, or the like) or be a shape including any number of sides (e.g., 2, 3, ... up to an N number of sides). By way of another example, the one or more protrusions 312 may be raised from the top surface of the bite 308. For instance, a raised protrusion 312 may be any three-dimensional shape known in the art including hemispherical (e.g., hemispherical, hypo-hemispherical, hyper-hemispherical, or the like) or including any number of sides (e.g., 2, 3, ... up to an N number of sides). The one or more protrusions 312 may be set in a patterned or un-patterned arrangement. Where there are multiple protrusions 312, the multiple protrusions 312 may be identical. It is noted herein, however, that a protrusion 312 of the multiple protrusions 312 may differ from an additional protrusion 312 of the multiple protrusions 312 in one or more spatial parameters including, but not limited to, shape, size, rotation, arrangement, or the like.

The one or more structural hooks 306 may include a bend 314 coupled to the bite 308. The bend 314 may include one or more corners. For example, the one or more corners may include one or more fillets, one or more chamfers, and/or one or more edges. The bend 314 may be symmetric or non-symmetric (e.g., include an arc defined by a constant radius, or include an arc defined by a varying radius).

The one or more structural hooks 306 may include a shank 316 coupled to the bend 314. The shank 316 may be set at an angle to the bite 308. It is noted herein, however, that the shank 316 may be parallel to the bite 308.

The one or more hook receptacles 300 may include a rear wall 318. For example, the rear wall 318 may include the rear interior surface of the opening 302 to which the friction angle plate 304 may be coupled. The one or more structural hooks 306 may contact the rear wall 318 and/or the friction angle plate 304 when latched. In this regard, the one or more structural hooks 306 may not pass through the one or more hook receptacles 300. It is noted herein, however, that the one or more hook receptacles 300 may not include the rear wall 318, and that the one or more structural hooks 306 may or may not be of a length to pass through the one or more hook receptacles 300.

The one or more structural hooks 306 may be rotatable between a latched position and an unlatched position about an axis through a hole 322 in an eye 320, where the latched position corresponds to the TTOL position for the aircraft seat 102 and the unlatched position corresponds to the non-TTOL position for the aircraft seat 102. For example, the axis through the hole 322 about which the one or more structural hooks 306 rotate may be aligned (e.g., vertically aligned) with the point 310. By way of another example, the axis through the hole 322 about which the one or more structural hooks 306 may rotate may be offset a selected distance from vertical alignment with the point 310.

One or more dimensions of the one or more structural hooks 306 may be selected to reduce the possibility of the one or more structural hooks 306 undergoing deflection and/or deformation caused by a dynamic load (e.g., impact to the aircraft and/or the aircraft seat 102, berthed seat experiences during flight, weight of an occupant, or the like), where the deflection and/or deformation causes the one or more structural hooks 306 to not latch to (or not unlatch from) the one or more hook receptacles 300. For example, the one or more dimensions may be selected to increase vertical space for engagement of the one or more structural hooks 306 to the one or more hook receptacles 300. In this regard, the one or more structural hooks 306 may be dimensioned to unlatch from (or latch to) the one or more hook receptacles 300 without interference.

The one or more protrusions 312 may be spaced a selected distance 324 from a surface of the friction angle plate 304. For example, the distance 324 may range from 0.0250 to 0.0500 inches between the one or more protrusions 312 and the surface of the friction angle plate 304. For instance, the distance 324 may be 0.0395 inches between the one or more protrusions 312 and the surface of the friction angle plate 304. In addition, the distance 324 may be 0.0435 inches between the one or more protrusions 312 and the surface of the friction angle plate 304. It is noted herein the one or more protrusions 312 may engage the friction angle plate 304 when the aircraft seat 102 is under a dynamic load, closing the selected distance 324. For example, contact with the friction angle plate 304 with the one or more protrusions 312 may prevent the one or more structural hooks 306 from slipping within and/or out of the opening 302 of the one or more hook receptacles 300.

The bite 308 may be spaced a selected distance 326 from a surface of the opening 302. For example, the distance 326 may range from 0.1500 to 0.3500 inches between the point 310 and the surface of the opening 302. For instance, the distance 326 may be 0.3025 inches between the point 310 and the surface of the opening 302. In addition, the distance 326 may be 0.2173 inches between the point 310 and the surface of the opening 302. The bite 308 may be a selected length 328. For example, the selected length 328 may range from 0.9000 to 1.200 inches. For instance, the selected length 328 may be 1.094 inches.

The one or more structural hooks 306 may include a gap between the point 310 and the shank 316. For example, where the gap is defined as a selected distance 330 between the bite 308 and the intersection of the bend 314 and the shank 316, the selected distance 330 may range from 0.5000 to 0.7500 inches. For instance, the selected distance 330 may be 0.6875 inches. By way of another example, where the gap is defined as a selected distance 332 between the bite 308 and the intersection of the shank 316 and the eye 320, the selected distance 332 may range from 1.100 to 1.350 inches. For instance, the selected distance 332 may be 1.250 inches.

A plane through the shank 316 may be set at an angle 334 relative to a plane through the bite 308. For example, the angle 334 may range from 10 to 30 degrees. For instance, the angle 334 may be 18 degrees. It is noted herein, however, that the plane through the shank 316 may be parallel to the plane through the bite 308.

The dynamic retention system 118 may include a hook spring 336 coupled to and/or configured to interact with the one or more structural hooks 306. The rotation of the one or more structural hooks 306 may be dampened by the hook spring 336. For example, the hook spring 336 may be configured to hold the structural hook 306 in the latched position when the aircraft seat 102 is in the TTOL position. By way of another example, the hook spring 336 may be configured to hold the structural hook 306 in the unlatched position when the aircraft seat 102 is in the non-TTOL position.

Figure 6A:
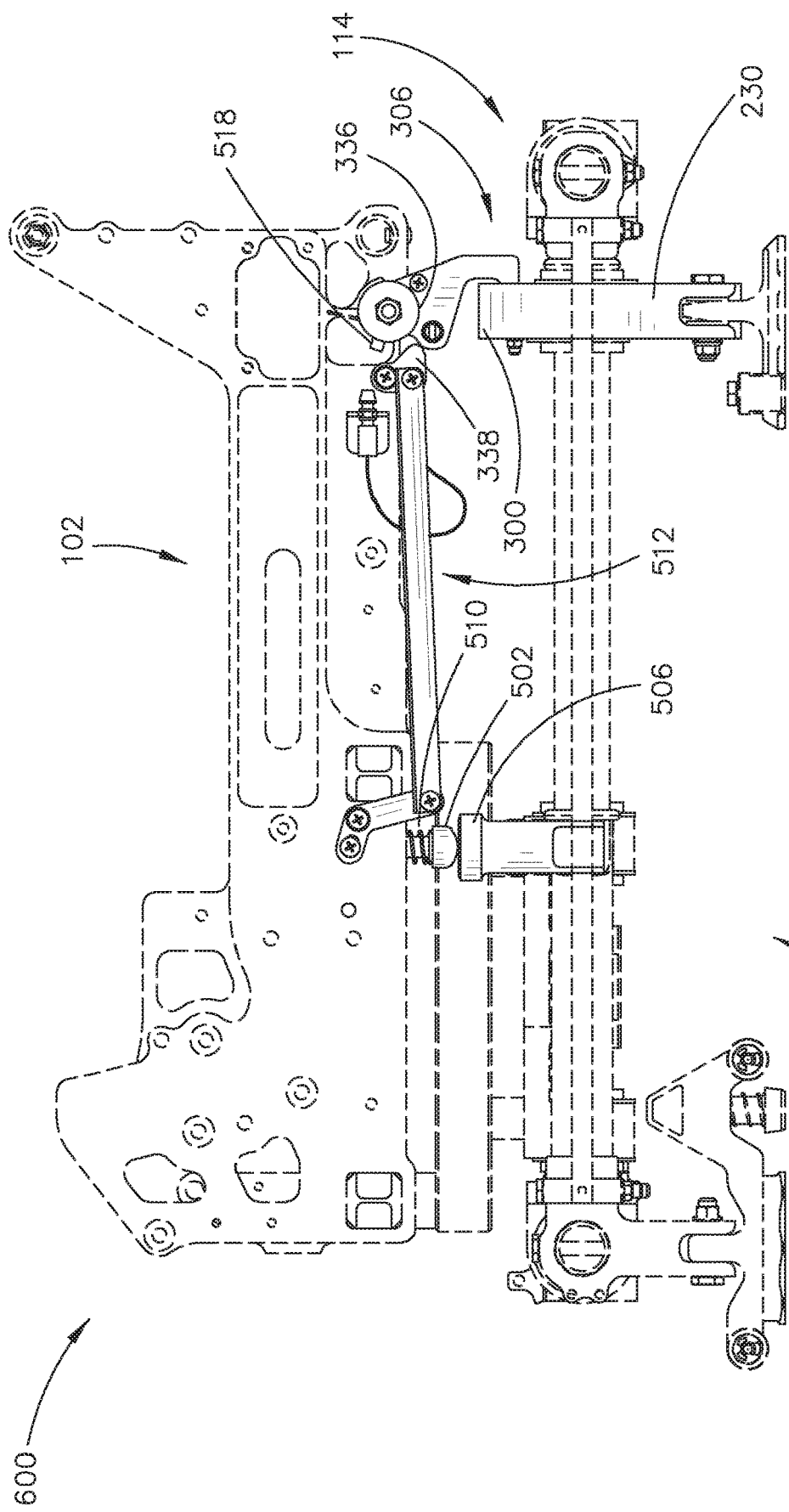
FIG. 6A is a partial side view of an exemplary embodiment of an aircraft seat including a dynamic retention system according to the inventive concepts disclosed herein.
Figure 6B:
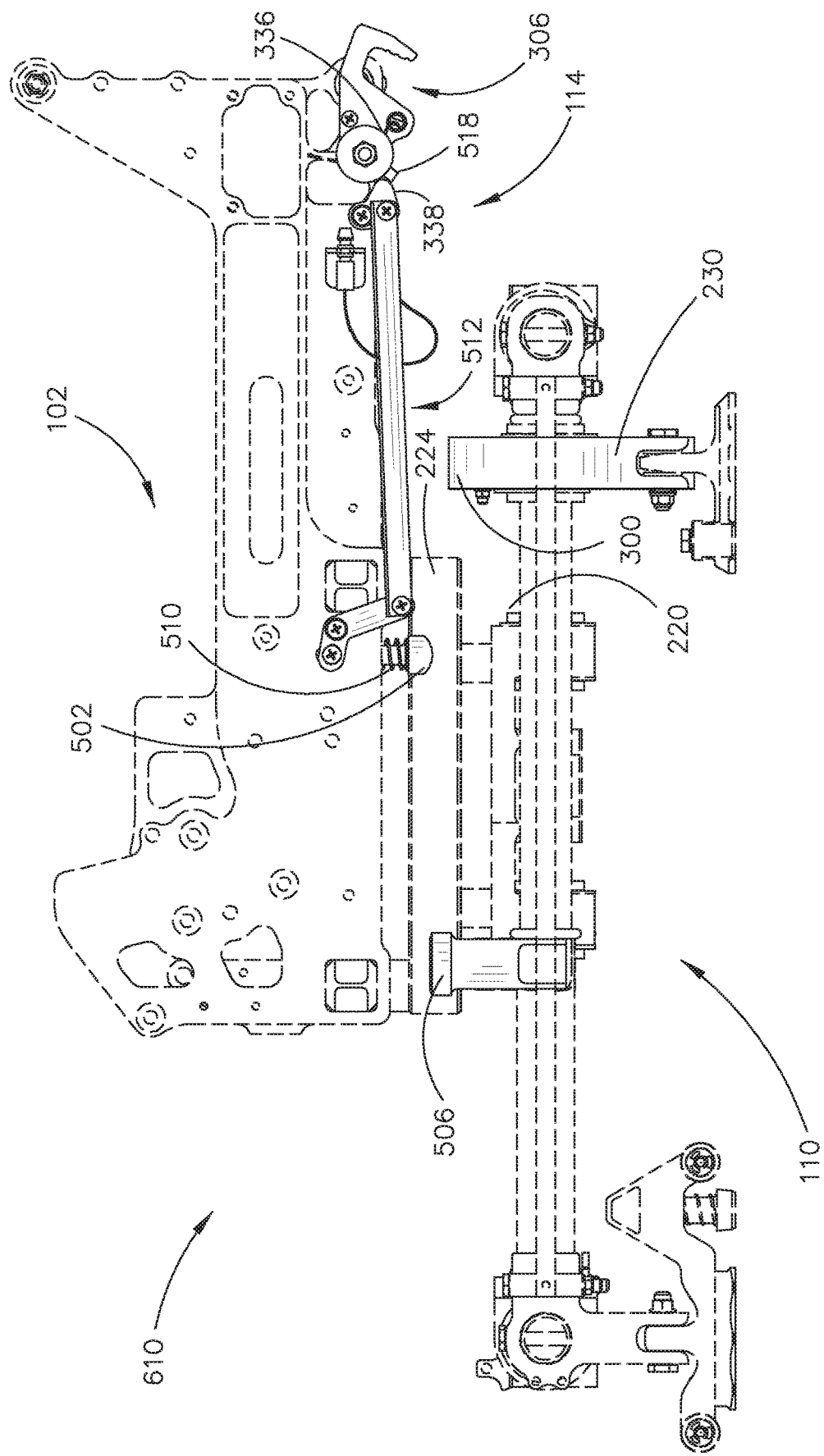
FIG. 6B is a partial side view of an exemplary embodiment of an aircraft seat including a dynamic retention system according to the inventive concepts disclosed herein.

The dynamic retention system 118 may include a hook retainer latch 338 coupled to and/or configured to interact with the one or more structural hooks 306. The hook retainer latch 338 may cause the one or more structural hooks 306 to rotate. For example, the one or more structural hooks 306 may rotate from the unlatched position to the latched position when disengaged (or released) by the hook retainer latch 338 (e.g., the hook retainer latch 338 may disengage or release a latch protrusion 518, as illustrated in FIGS. 5B and 6A) when the aircraft seat 102 is in the TTOL position. By way of another example, the one or more structural hooks 306 may rotate from the latched position to the unlatched position via the force from the hook spring 336 when the one or more structural hooks 306 are engaged by the hook retainer latch 338 (e.g., the hook retainer latch 338 may engage the latch protrusion 518, as illustrated in FIGS. 5B and 6B) when the aircraft seat 102 is in the non-TTOL position.

It is noted herein the exemplary embodiments illustrated in FIGS. 3A-3C implement the one or more hook receptacles 300 and the one or more structural hooks 306 of the dynamic retention system 118 proximate to (e.g., at or near) the front of the aircraft seat 102 (e.g., for aft-facing conditions). It is noted herein, however, that the dynamic retention system 118, any component of the dynamic retention system 118, and/or any other component of the aircraft seat 102 may be adapted and/or configured as necessary to be implemented at or near the rear of the aircraft seat 102 for forward-facing conditions. For example, the aircraft seat 102 may implement the one or more hook receptacles 300 and the one or more structural hooks 306 of the dynamic retention system 118 proximate to (e.g., at or near) the rear of the aircraft seat 102 (e.g., for forward-facing conditions). Therefore, the above description should not be interpreted as a limitation on the present disclosure but merely an illustration.

Figure 4:
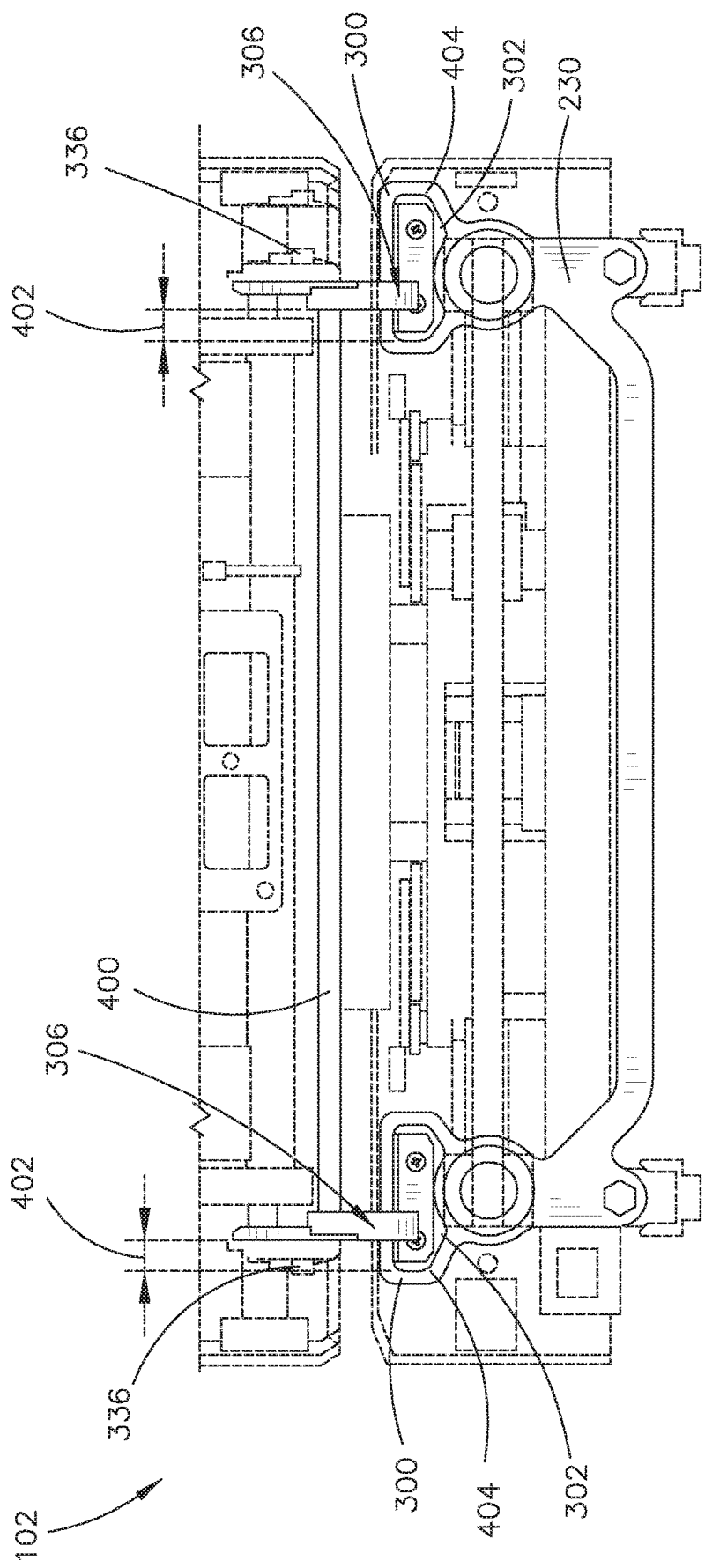
FIG. 4 is a partial front view of an exemplary embodiment of an aircraft seat including a dynamic retention system according to the inventive concepts disclosed herein.

FIG. 4 illustrates the aircraft seat 102 including the dynamic retention system 118 according to the inventive concepts disclosed herein.

Where the dynamic retention system 118 includes multiple structural hooks 306, the dynamic retention system 118 may include a set of hook springs 336 (e.g., a hook spring 336 for each of the multiple structural hooks 306). It is noted herein the set of hook springs 336 may reduce the possibility of the multiple structural hooks 306 not fully latching in corresponding hook receptacles 300.

Where the dynamic retention system 118 includes multiple structural hooks 306, the dynamic retention system 118 may include a tie rod 400 to couple the multiple structural hooks 306 together. For example, the tie rod 400 may assist in regulating the rotation of the multiple structural hooks (e.g., rotating the multiple structural hooks 306 simultaneously). By way of another example, the tie rod 400 may transfer a rotational motion between the multiple structural hooks 306.

The one or more hook receptacles 300 may be dimensioned such that the one or more structural hooks 306 may include a gap defined by a selected distance 402 from a surface 404 of the opening 302 when the one or more structural hooks 306 are latched onto the one or more hook receptacles 300. For example, the selected distance 402 may range from 0.2500 inches to 0.7500 inches. For instance, the selected distance 402 may be 0.5000 inches. It is noted herein the gap may be necessary to add an amount of tolerance when releasing of the one or more structural hooks 306 (e.g., latching the one or more structural hooks 306 to the one or more hook receptacles 300), thus allowing the one or more structural hooks 306 to latch before fully reaching the TTOL position during TTOL.

At least a portion of the shroud 112 (e.g., the base shroud section 116) may be configured to accommodate the one or more hook receptacles 300. For example, the shroud 112 may include one or more cut-outs configured to map to the one or more hook receptacles 300.

FIGS. 5A and 5B illustrate the aircraft seat 102 including the dynamic retention system 118 according to the inventive concepts disclosed herein.

The dynamic retention system may include a plunger assembly 500. The plunger assembly 500 may include a plunger 502. The plunger assembly 500 may include a plunger base 504 (e.g., a plunger receptacle 504) with a plunger base dome 506 protruding from a top surface. The plunger 502 may include a plunger dome 508 protruding from a bottom surface and configured to contact the plunger base dome 506. One or more of the plunger base dome 506 and/or the plunger dome 508 may be any three-dimensional shape known in the art including hemispherical (e.g., hemispherical, hypo-hemispherical, hyper-hemispherical, or the like) or including any number of sides (e.g., 2, 3, . . . up to an N number of sides). At least a portion of the bottom surface of the plunger 502 and/or the top surface of the plunger base 504 may include a flat portion surrounding the plunger base dome 506 and/or the plunger dome 508, respectively. It is noted herein, however, that the entire bottom surface of the plunger 502 and/or the top surface of the plunger base 504 may be flat, such that the plunger 502 does not include the plunger dome 508 and/or the plunger base 504 does not include the plunger base dome 506, respectively.

The plunger base 504 may be coupled either directly to, or indirectly coupled proximate to, the one or more base rails 214 and/or the one or more cross base rails 212. The plunger 502 may be coupled proximate to (e.g., adjacent to, passed through a hole in, or the like) one or more of the components 206, 208. The plunger 502 may engage a plunger spring 510. For example, the plunger spring 510 may be compressed when the plunger dome 508 is in contact with the plunger base dome 506.

It is noted herein that the plunger assembly 500 may be configured to prevent possible misalignment of the aircraft seat 102 when in the TTOL position. For example, the portion of the top surface of the plunger base 504 and/or the bottom surface of the plunger 502 may be flat to add an amount of tolerance when releasing of the one or more structural hooks 306 (e.g., latching the one or more structural hooks 306 to the one or more hook receptacles 300), thus allowing the one or more structural hooks 306 to latch before fully reaching the TTOL position. By way of another example, the plunger spring 510 may include a low force spring. By way of another example, one or more bushings may be incorporated into the plunger assembly 500 to minimize friction within the plunger assembly 500.

In addition, it is noted herein that the one or more structural hooks 306 may remain in the TTOL position during a non-TTOL stage of flight if the plunger spring 510 is not utilized, and the one or more structural hooks 306 may still engage the one or more hook receptacles 300 during TTOL. In this regard, the plunger spring 510 may not be a required or integral component of the dynamic retention system 118.

The dynamic retention system 118 may include a linkage assembly 512 with one or more linkage members. For example, the linkage assembly 512 may include, but is not limited to, one or more rotation linkage members 514 and one or more translation linkage members 516. For instance, the linkage assembly 512 may include a rotation linkage member 514 and a translation linkage member 516, where the rotation linkage member 514 is coupled to the plunger 502 and the translation linkage member 516, where the translation linkage member 516 is coupled to the hook retainer latch 338. The hook retainer latch 338 may be configured to interact with the latch protrusion 518 (e.g., tab) on the one or more structural hooks 306.

In one example, where there are multiple structural hooks 306, the dynamic retention system 118 may include a single plunger assembly 500 and a single linkage assembly 512. In this example, actuation of the single plunger assembly 500 and the single linkage assembly 512 is transferred between the multiple structural hooks 306 via the tie rod 400 (e.g., as illustrated in FIG. 4) to regulate the rotational motion of the multiple structural hooks 306.

In another example, where there are multiple structural hooks 306, the dynamic retention system 118 may include a plunger assembly 500 and a linkage assembly 512 for each of the structural hooks 306. In this example, the tie rod 400 (e.g., as illustrated in FIG. 4) may assist in regulating the rotation of the multiple structural hooks 306. It is noted herein, however, that the tie rod 400 may not be a required or integral component of the dynamic retention system 118.

The dynamic retention system 118 may include one or more actuation cables 520 coupled to an assist motor (not shown). For example, the dynamic retention system 118 may include an actuation cable 520 configured to actuate the one or more structural hooks 306. The one or more actuation cables 520 may be configured to pull the one or more structural hooks 306, such that the assist motor may operate the one or more structural hooks 306 simultaneously and/or independently with actuation (e.g., track/translate, swivel/rotate, or the like) of the aircraft seat 102 via the actuation assembly 224.

It is noted herein that if the actuation cable 520 fails while the aircraft seat 102 is in the non-TTOL position during a non-TTOL stage of flight, the one or more structural hooks 306 may still latch upon contact of the plunger dome 508 against the plunger base dome 506 when the seat enters the TTOL position during TTOL. In this regard, failure of the actuation cable 520 may not prevent the aircraft seat 102 from entering the TTOL position.

Although exemplary embodiments of the present disclosure are directed to the one or more hook receptacles 300 coupled to the fixed base rail 230 and the one or more structural hooks 306 coupled to the seat frame 202, it is noted herein that one or more components of the aircraft seat 102 may be configured (e.g., rearranged, added, removed, or the like) such that the one or more hook receptacles 300 may be coupled to the seat frame 202 and the one or more structural hooks 306 coupled to the fixed base rail 230. Therefore, the above description should not be interpreted as a limitation on the present disclosure but merely an illustration.

Figure 6C:
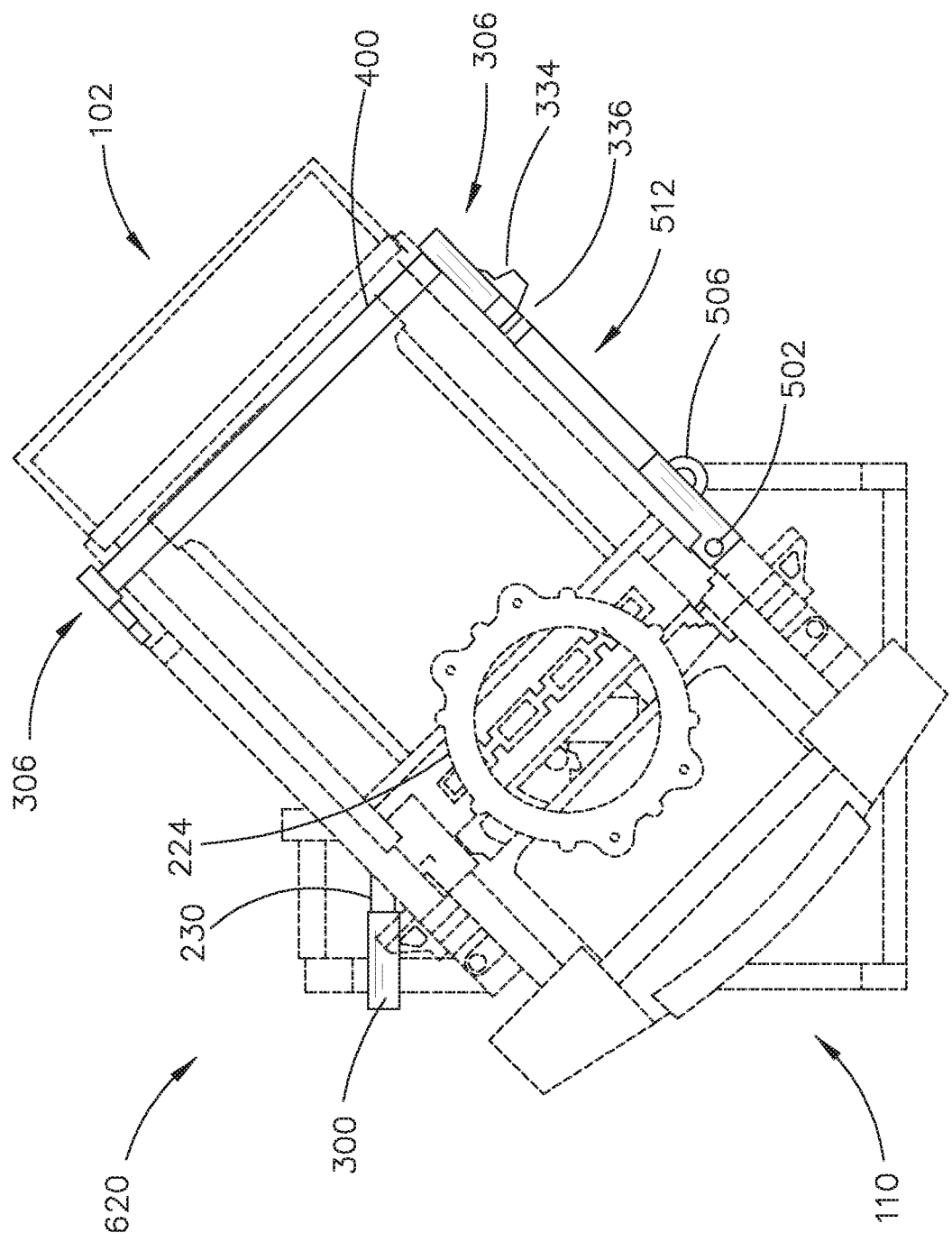
FIG. 6C is a top view of an exemplary embodiment of an aircraft seat including a dynamic retention system according to the inventive concepts disclosed herein.

FIGS. 6A-6C generally illustrate the aircraft seat 102 including the dynamic retention system 118 in one or more operational states according to the inventive concepts disclosed herein.

FIG. 6A illustrates an operational state 600 where the aircraft seat 102 is in the TTOL position. In the TTOL position, the aircraft seat 102 may be positioned over the base 110, and the one or more structural hooks 306 may be in the latched position. The plunger dome 508 may be in contact with the plunger base dome 506, causing the plunger 502 to raise and the plunger spring 510 to compress. The raising of the plunger 502 may retract (e.g., pull back) the linkage assembly 512 (e.g., via rotation of the rotation linkage member 514 about an axis and translation of the translation linkage member 516 along an axis), which may disengage the hook retainer latch 338 from the latch protrusion 518 and release the one or more structural hooks 306. When the structural hook 306 is released, the hook spring 336 may return the one or more structural hooks 306 to the latched position (e.g., via a force provided by a hook spring 336, via gravity, or the like), where the one or more structural hooks 306 engage the one or more hook receptacles 300.

FIG. 6B illustrates an operational state 610 where the aircraft seat 102 is in the non-TTOL position. In the non-TTOL position, the aircraft seat 102 may be translated along the one or more tracking rails 220 via the tracking base 228 of the actuation assembly 224, and the one or more structural hooks 306 may be in the unlatched position. Translating the aircraft seat 102 may unseat the plunger dome 508 from the plunger base dome 506 (e.g., break contact between the plunger 502 and the plunger base 504), allowing the compressed plunger spring 510 to decompress and push the plunger 502 downward. The downward motion of the plunger 502 may extend the linkage assembly 512 forward (e.g., via rotation of the rotation linkage member 514 about an axis and translation of the translation linkage member 516 along an axis), which may cause the hook retainer latch 338 to engage the latch protrusion 518 and raise the one or more structural hooks 306 into the unlatched position. When the one or more structural hooks 306 are in the unlatched position, the force provided by the hook retainer latch 338 on the latch protrusion 518 may overcome the force provided on the one or more structural hooks 306 (e.g., by the hook spring 336, by gravity, or the like), such that the one or more structural hooks 306 are held in the unlatched position.

FIG. 6C illustrates an operational state 620 where the aircraft seat 102 is in the non-TTOL position. In the non-TTOL position, the aircraft seat 102 may be rotated about an axis through the actuation assembly 224, and the one or more structural hooks 306 may be in the unlatched position. Rotating the aircraft seat 102 may unseat the plunger dome 508 from the plunger base dome 506 (e.g., break contact between the plunger 502 and the plunger base 504), allowing the compressed plunger spring 510 to decompress and push the plunger 502 downward. The downward motion of the plunger 502 may extend the linkage assembly 512 forward (e.g., via rotation of the rotation linkage member 514 about an axis and translation of the translation linkage member 516 along an axis), which may cause the hook retainer latch 338 to engage the latch protrusion 518 and raise the one or more structural hooks 306 into the unlatched position. When the one or more structural hooks 306 are in the unlatched position, the force provided by the hook retainer latch 338 on the latch protrusion 518 may overcome the force provided on the one or more structural hooks 306 (e.g., by the hook spring 336, by gravity, or the like), such that the one or more structural hooks 306 are held in the unlatched position.

It is noted herein the aircraft seat 102 may be in the non-TTOL position where the aircraft seat 102 has both translated and rotated a select amount. Therefore, the above description should not be interpreted as a limitation on the present disclosure but merely an illustration.

One or more components of the dynamic retention system 118 may include and/or be configured to operate with an electrical sensor. For example, the actuation of the plunger 502 may be monitored by the electrical sensor which may transfer a signal to a motor configured to actuate the one or more structural hooks 306. The electrical sensor may be coupled (e.g., communicatively and/or physically coupled) to one or more controllers integrated in and/or configured to operate with the aircraft. For example, the actuation of the plunger 502 may be monitored by the electrical sensor which may transfer a signal to the one or more controllers, where the one or more controllers may transfer a signal to the motor configured to actuate the one or more structural hooks 306. It is noted herein that one or more components of the dynamic retention system 118 may be configured to operate directly with the one or more controllers.

A controller may include one or more processors and memory, where the memory may store one or more sets of program instructions. The controller may be coupled to one or more display devices. A display device may include one or more displays and/or one or more user input devices. Commands received via the one or more user input devices and/or via the one or more communication interfaces may adjust one or more components of the dynamic retention system 118. For example, the commands received via the one or more user input devices may cause the aircraft seat 102 to translate and/or rotate. For instance, the commands received may control the assist motor coupled to and configured to interact with the actuation cable 520.

As will be appreciated from the above embodiments, the inventive concepts disclosed herein are directed to a dynamic retention system for an aircraft seat configured to allow for motion of the aircraft seat via at least one of tracking or swiveling, and further configured to distribute a dynamic load applied to the aircraft seat.

It is to be understood that embodiments of the methods in accordance with the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A dynamic retention system for an aircraft seat, comprising:

at least one plunger assembly comprising:

a plunger base coupled to a base assembly of an aircraft seat, the base assembly couplable to a floor of an aircraft; and a spring-loaded plunger coupled to a seat frame of the aircraft seat, the spring-loaded plunger configured to contact the plunger base;

at least one hook receptacle coupled to the base assembly;

at least one structural hook coupled to the seat frame, the at least one hook receptacle configured to receive the at least one structural hook responsive to the spring-loaded plunger contacting the plunger base; and at least one hook spring configured to hold the at least one structural hook in a withdrawn position when the spring-loaded plunger is not in contact with the plunger base, the seat frame coupled to the base assembly via an actuation assembly, the aircraft seat being actuatable between a first position and at least a second position via the actuation assembly, the aircraft seat being in the first position when the spring-loaded plunger is in contact with the plunger base and the at least one structural hook is received within the at least one hook receptacle, the aircraft seat being in the at least the second position when the spring-loaded plunger is not in contact with the plunger base and the at least one structural hook is withdrawn from the at least one hook receptacle.

2. The dynamic retention system in claim 1, a top surface of the plunger base comprising a plunger base dome, a bottom surface of the spring-loaded plunger comprising a plunger dome, the at least one structural hook configured to engage the at least one hook receptacle when the plunger dome engages the plunger base dome.

3. The dynamic retention system in claim 2, the spring-loaded plunger being in a compressed position when the plunger dome engages the plunger base dome.

4. The dynamic retention system in claim 2, a portion of the top surface of the plunger base being flat, the flat portion of the top surface of the plunger base surrounding the plunger base dome.

5. The dynamic retention system in claim 1, further comprising:

a linkage assembly coupled to the spring-loaded plunger; and a hook retainer latch coupled to the linkage assembly, the hook retainer latch configured to contact a latch protrusion on the at least one structural hook.

6. The dynamic retention system in claim 5, the at least one structural hook configured to be withdrawn from the at least one hook receptacle when the hook retainer latch contacts the latch protrusion on the at least one structural hook.

7. The dynamic retention system in claim 1, the at least one structural hook comprising at least two structural hooks, the dynamic retention system further comprising:

a tie rod between the at least two structural hooks, the tie rod configured to transfer rotation between the at least two structural hooks.

8. The dynamic retention system in claim 7, the at least one hook spring including at least two hook springs, each of the at least two hook springs configured to hold a corresponding structural hook of the at least two structural hooks in a withdrawn position when the spring-loaded plunger is not in contact with the plunger base.

9. The dynamic retention system in claim 1, the dynamic retention system further comprising:

an actuation cable configured to assist actuation of the aircraft seat between the first position and the at least the second position.

10. The dynamic retention system in claim 1, the at least one hook receptacle comprising a friction angle plate, the friction angle plate coupled to an interior surface of a rear wall within an opening of the at least one hook receptacle.

11. The dynamic retention system in claim 10, the at least one structural hook comprising one or more protrusions, the one or more protrusions separated a selected distance from the friction angle plate when the aircraft seat is unloaded, the one or more protrusions configured to contact the friction angle plate when a dynamic load is applied to the aircraft seat, the at least one structural hook configured to distribute the dynamic load applied to the aircraft seat through at least the base assembly when the one or more protrusions are in contact with the friction angle plate.

12. The dynamic retention system in claim 1, the first position comprising a taxi, take-off, or landing (TTOL) position, the at least the second position comprising at least one non-TTOL position.

13. The dynamic retention system in claim 12, the aircraft seat being translatable between the first position and the at least the second position along one or more tracking rails coupled to the base assembly via a tracking base of the actuation assembly.

14. The dynamic retention system in claim 13, the aircraft seat being rotatable between the first position and the at least the second position about an axis through a swivel base of the actuation assembly.

15. The dynamic retention system in claim 1, the at least one hook receptacle coupled to a fixed base rail.

16. The dynamic retention system in claim 15, the fixed base rail coupled to the base assembly proximate to a front of the aircraft seat, the at least one hook receptacle and the at least one structural hook implemented proximate to the front of the aircraft seat.

17. The dynamic retention system in claim 15, the fixed base rail coupled to the base assembly proximate to a rear of the aircraft seat, the at least one hook receptacle and the at least one structural hook implemented proximate to the rear of the aircraft seat.

18. An aircraft seat, comprising:
a base assembly couplable to a floor of an aircraft;
a seat frame coupled to the base assembly via an actuation assembly; and
a dynamic retention system comprising:
at least one plunger assembly comprising:
a plunger base coupled to the base assembly; and
a spring-loaded plunger coupled to the seat frame, the spring-loaded plunger configured to contact the plunger base;
at least one hook receptacle coupled to the base assembly;
at least one structural hook coupled to the seat frame, the at least one hook receptacle configured to receive the at least one structural hook responsive to the spring-loaded plunger contacting the plunger base; and
at least one hook spring configured to hold the at least one structural hook in a withdrawn position when the spring-loaded plunger is not in contact with the plunger base,
the actuation assembly configured to allow for actuation between a first position and at least a second position,
the first position being when the spring-loaded plunger is in contact with the plunger base and the at least one structural hook is received within the at least one hook receptacle,
the at least the second position being when the spring-loaded plunger is not in contact with the plunger base and the at least one structural hook is withdrawn from the at least one hook receptacle.

19. A dynamic retention system for a seat, comprising:
at least one assembly comprising:
a first component coupled to a base assembly of a seat, the base assembly couplable to a floor of a vehicle; and
a second component coupled to a seat frame of the vehicle, the second component configured to contact the first component;
at least one hook receptacle coupled to the base assembly;
at least one structural hook coupled to the seat frame, the at least one hook receptacle configured to receive the at least one structural hook responsive to the second component contacting the first component; and
at least one hook spring configured to hold the at least one structural hook in a withdrawn position when the spring-loaded plunger is not in contact with the plunger base,
the seat frame coupled to the base assembly via an actuation assembly, the seat being actuatable between a first position and at least a second position via the actuation assembly,
the seat being in the first position when the second component is in contact with the first component and the at least one structural hook is received within the at least one hook receptacle,
the seat being in the at least the second position when the second component is not in contact with the first component and the at least one structural hook is withdrawn from the at least one hook receptacle.

* * * * *